United States Patent

[11] 3,603,208

[72] Inventor Oswald O. Kytta
  South Bend, Ind.
[21] Appl. No. 837,511
[22] Filed June 30, 1969
[45] Patented Sept. 7, 1971
[73] Assignee The Bendix Corporation

[54] SERVOMOTOR HAVING A ONE-PIECE CENTER PLATE
  7 Claims, 3 Drawing Figs.
[52] U.S. Cl. ..................................................... 91/376,
  91/357, 92/48
[51] Int. Cl. ..................................................... F15b 9/10,
  F01b 19/00
[50] Field of Search .......................................... 91/376,
  369, 357; 92/48, 49

[56] References Cited
UNITED STATES PATENTS
2,989,035 6/1961 Stelzer ......................... 91/376
3,411,414 11/1968 Brown et al. ................. 92/48

Primary Examiner—Paul E. Maslousky
Attorneys—C. F. Arens and Plante, Arens, Hartz, Hix and Smith ABSTRACT: A partition member for dividing a servomotor into a pair of opposing fluid pressure chambers. A first movable wall having a thickened end adjacent a front shell is fixed to the front end of a hub. A second movable wall having a thickened end which abuts the front shell is fixed to the rear of the hub. The partition member surrounds the hub and compresses the thickened ends of said first and second movable walls into sealing engagement with the front and a rear shell, respectively. A valve member responsive to an operator closes a passage within the hub to create a pressure differential across the first and second movable wall to provide a force to operate a power braking system.

INVENTOR.
OSWALD O. KYTTA

PATENTED SEP 7 1971 3,603,208

INVENTOR.
OSWALD O. KYTTA
BY
Plante, Arens, Hartz, Hix and Smith
ATTORNEYS

SERVOMOTOR HAVING A ONE-PIECE CENTER PLATE

SUMMARY OF THE INVENTION

This invention is primarily concerned with the improvement of fluid pressure servomotors for use in association with power braking systems employed in today's automotive vehicles. More particularly, the invention concerns a structural concept for minimizing, if not eliminating, fluid pressure leaks due to misassembly of the servomotor during manufacture.

It is an object of this invention to provide a servomotor that is not susceptible to misassembly of components so as to cause pressure leaks.

It is an object of this invention to provide a servomotor having structural improvements in the design of the partition means that facilitate the fluid pressure differential used to move the movable wall to be communicated internal to the hub of the movable wall rather than around the outer periphery of the movable wall.

It is an object of this invention to provide a servomotor that has a partition means positively located between and in engagement with the two shell sections that form the housing of the servomotor.

Other objects and features of the invention will be apparent from the following description of the servomotor taken in connection with the accompanying drawings.

DETAILED DESCRIPTION OF THE INVENTION

Figure 1:
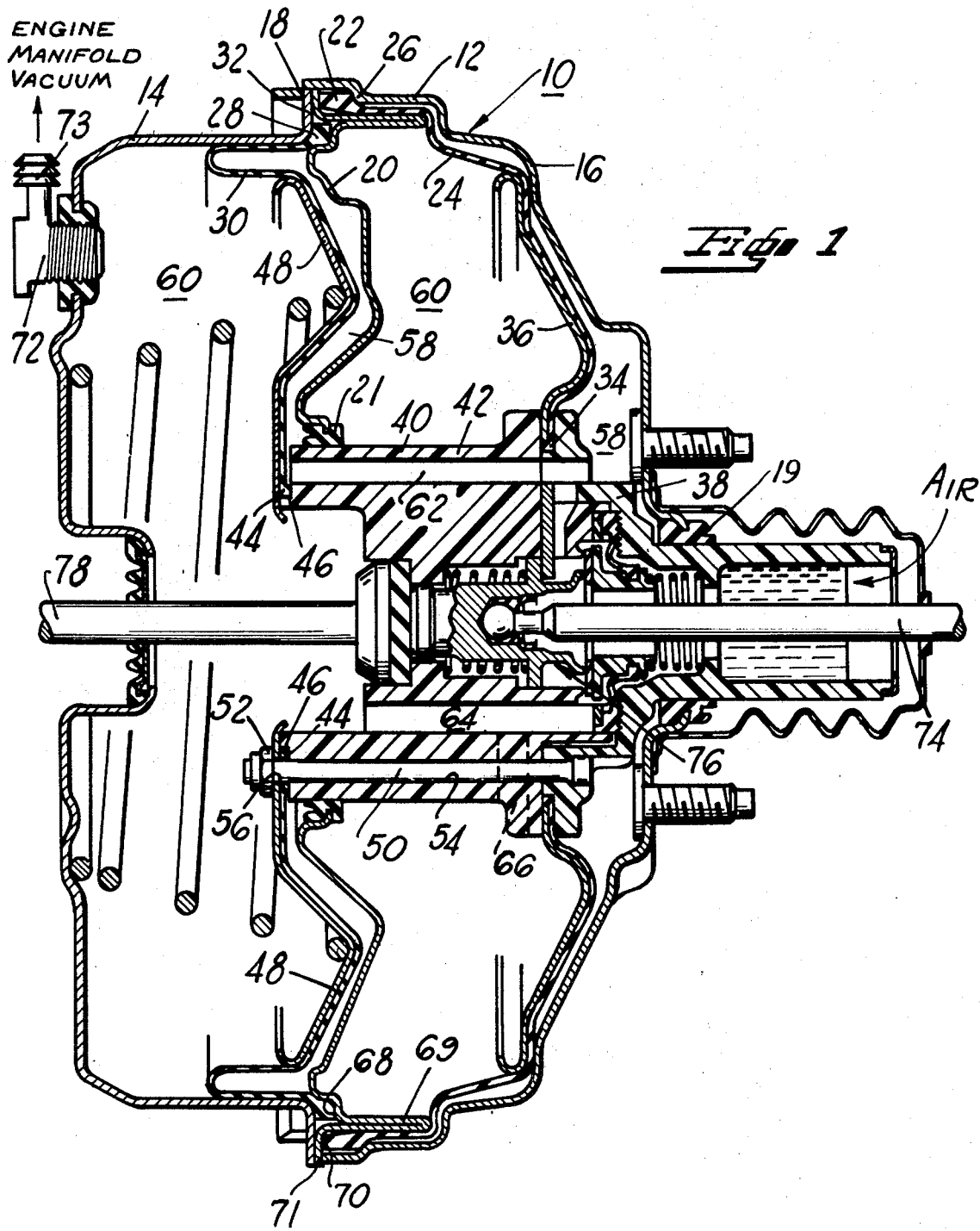
FIG. 1 is a sectional view of a fluid pressure servomotor incorporating the elements of this invention.

With reference now to FIG. 1, there is shown a fluid pressure servomotor 10 having a housing 12 comprised of a forward shell 14 and a rearward shell 16 joined as at 18 by a bayonet-type twist lock arrangement, such as is more fully described in U. S. Pat. No. 3,083,698, assigned to the common assignee of this patent. It is noted that before joining the shells, the internal components of the servomotor 10 are assembled since the joining of the shells renders the components inaccessible. A partition means or center plate 20, including an annular bearing seal 21, is sandwiched between so as to positively engage the shells 14 and 16. The partition means 20 thus compresses an outer bead 22 of a diaphragm 24 against flange 26 of the rearward shell 16, and an outer bead 28 of a diaphragm 30 against flange on shoulder 32 of the forward shell 14, to insure a fluidtight seal therebetween. The diaphragm 24 has an inner bead 34 which fits into a central opening in a diaphragm reinforcing plate 36 so that the diaphragm 24 and plate 36 may be compressed between portions 38 and 40 of a hub 42 to establish a fluid seal therebetween. The diaphragm 30 has an inner bead 44 which is compressed into a groove 46 of the hub 42 by a diaphragm reinforcing plate 48 to provide for a fluid seal at that point. As may be seen in the drawing, the portions 38 and 40 of the hub 42, the diaphragms 24 and 30, and the diaphragm reinforcing plates 36 and 48 are sealingly fastened together by bolts 50 and nuts 52 suitably installed in bores 54 of the hub 42 and passing through openings 56 of the diaphragm reinforcing plate 48.

The hub 42 and the partition means 20 along with the diaphragm assemblies aforementioned are preassembled such that the hub 42 is carried by the annular bearing seal 21 and seal 19 of the rearward shell 16 to allow for sliding motion between the hub 42 and partition means 20. Further, the hub 42, the diaphragms 24 and 30, and the diaphragm reinforcing plates 36 and 48 comprise movable wall means which defines first and second variable volume chambers 58 and 60, each including at least two portions, as may be seen clearly from the drawing. The first and second variable volume chambers 58 and 60 are divided into two sets of opposed variable volume chambers by the partition means 20, with each set of opposed variable volume chambers being comprised of portions of the chambers 58 and 60. It is noted that the chambers formed by the movable wall means are normally evacuated during the brake released position; i.e., the movable wall means is normally vacuum suspended within the servomotor 10. The hub 42 has inwardly from its outermost periphery a passage means or plurality of axial conduits 62 to allow communication of one portion of chamber 58 with its other portion. Further, the hub 42 has located inwardly from conduits 62 a passage means or plurality of axial conduits 64 which include radial extensions 66 to allow communication of one portion of chamber 60 with its other portion.

Figures 2, 3:
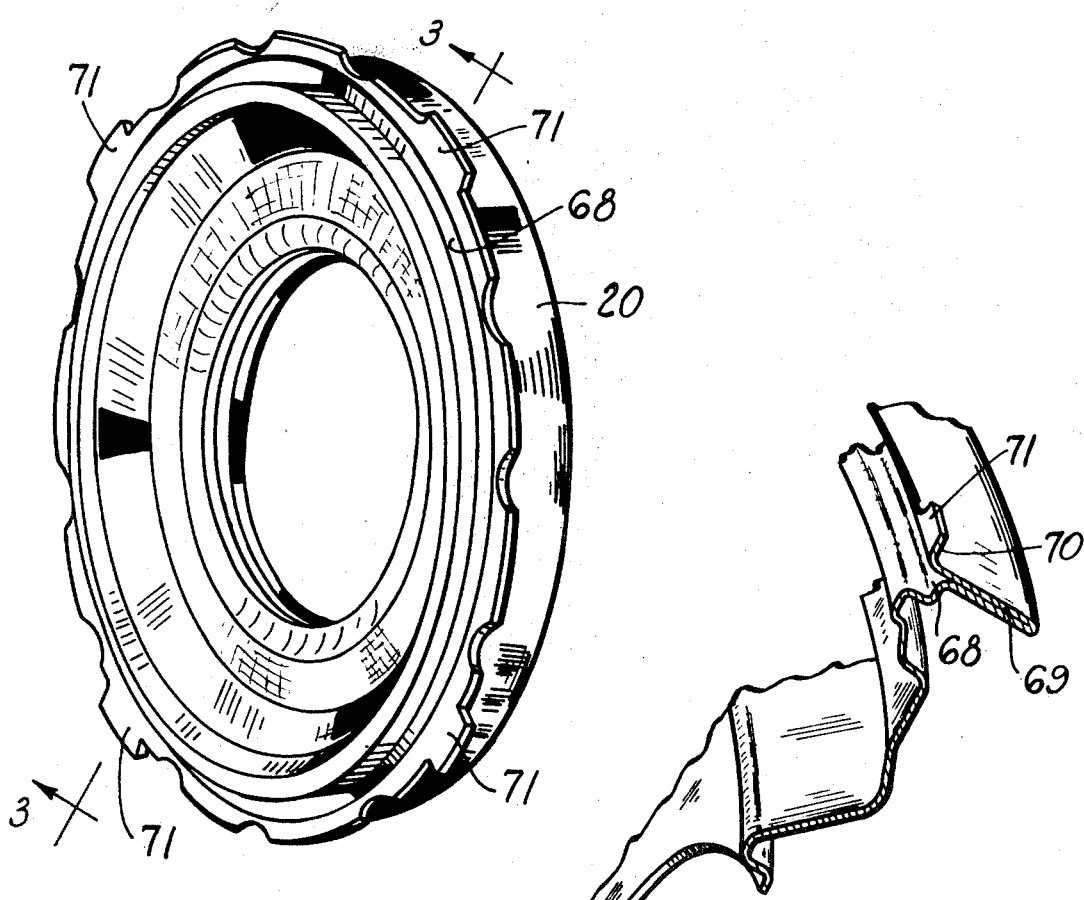
FIG. 2 is an isometric view of the partition means shown in FIG. 1.
FIG. 3 is a fragmented sectional view taken on line 3—3 of Figure 2.

With reference now to FIGS. 2 and 3, the partition means 20 is shown in an isometric view to clearly depict its structural contours. More specifically, it can be seen that the partition means 20 has shoulders 68 and 70 which compress against beads 28 and 22, respectively, to force said beads into contact with flanges 32 and 26, respectively, thereby creating a fluid tight seal therebetween. The partition means 20 further includes an axially extending support portion 69 which supports the diaphragm 24 of the movable wall. The structural contours of the shells 14 and 16 and the partition means 20 preclude misassembly of the beads 28 and 22. Additionally, it may be seen that the partition means 20 includes radially extending tab portions 71 which are sandwiched between the forward shell 14 and rearward shell 16 to positively locate said partition means 20 therebetween.

Referring back now to FIG. 1, chamber 60 is in communication through a check valve 72 and a conduit 73 with the engine manifold vacuum, not shown. A push rod 74 is operably connected to a brake pedal, not shown, to control a valve means 76 to admit atmospheric air into chamber 58 thereby developing a pressure differential across the movable wall means comprised of diaphragms 24 and 30, diaphragm reinforcing plates 36 and 48, and the hub 42. The pressure differential developed will cause the movable wall means to move to the left, as shown in FIG. 1. This movement of the movable wall causes shaft 78 to actuate a master cylinder piston, not shown.

For a more extensive description of the operation of portions of the fluid pressure servomotor, hereinabove disclosed, reference is made to copending U. S. Pat. application, Ser. No. 732,938, now U.S. Pat. No. 3,517,588, having the same assignee.

While the specific details have been herein shown and described, the invention is not confined thereto, as other substitutions can be made within the spirit and scope of the invention.

I claim:

1. A fluid pressure servomotor, comprising:
    a housing having first and second portions, said first and second portions having first and second annular flanges, respectively;
    partition means rigidly fixed between and in engagement with said first and second annular flanges for separating said first and second portions;
    movable wall means operatively arranged in said housing defining first and second variable volume chambers, said movable wall means including:
        a hub having passages interconnecting said first and second variable volume chambers, diaphragm means for dividing each of said first and second variable chambers into at least two portions and support means for retaining said diaphragm means on said hub;
    valve means carried by said hub, said valve means being operatively connected to said passages in said hub;
    operator-operated means for actuating said valve means, said valve means moving in response to said operator-operated means for creating a pressure differential across said movable wall means; and force-transmitting means responsive to said movable wall.

2. The servomotor, as recited in claim 1, wherein said first and second annular flanges face each other with one being substantially perpendicular with respect to the other.

3. The servomotor, as recited in claim 1, wherein said partition means includes;
first and second shoulders against which said diaphragm means are held by said first and second portions to establish a fluid seal therebetween.

4. In a servomotor of a power braking system, means for dividing the servomotor into a pair of opposing variable volume chambers, said means comprising:
a first shell having a central opening with a shoulder on an opened end;
a second shell having a central opening with an opened end having a flange which fits against said shoulder when joined to said first shell;
a hub member slidably retained in said second shell having first and second internal passages;
valve means connected to said hub member for supplying atmospheric pressure to said first internal passage;
first movable wall means attached to the front end of said hub member having a first bead located adjacent said shoulder of said first shell;
second movable wall means attached to the rear end of said hub member having a second bead concentric with said flange of said second shell; and
partition means having one end slidably secured to said hub and the other end compressing said first and second beads into sealing engagements upon joining said second shell with said first shell, said partition means permitting atmospheric pressure to be communicated through said first internal passage to the same side of said first and second movable wall means and a different pressure through said second internal passage to the other side of said first and second movable wall means to create a pressure differential causing said hub means to move in response to an operation of said valve means by an operator.

5. The servomotor, as recited in claim 4, wherein said first and second shell are joined together by twist lock means to maintain a fluidtight seal between said partition means, first and second beads and the first and second shells.

6. The servomotor, as recited in claim 5, wherein said other end of said partition means includes:
a radial portion which holds said first bead in sealing abutment with said first shell; and
an axially extending support integral with said radial portion for biasing said second bead into sealing engagement with said second shell.

7. The servomotor, as recited in claim 4, including:
means located on said front and rear shell engageable with said partition means for positively locating said first and second beads upon joining said second shell to said first shell.